C. VON FORELL.
PROCESS OF MANUFACTURING CEMENT.
APPLICATION FILED DEC. 19, 1901.
982,945.
Patented Jan. 31, 1911.
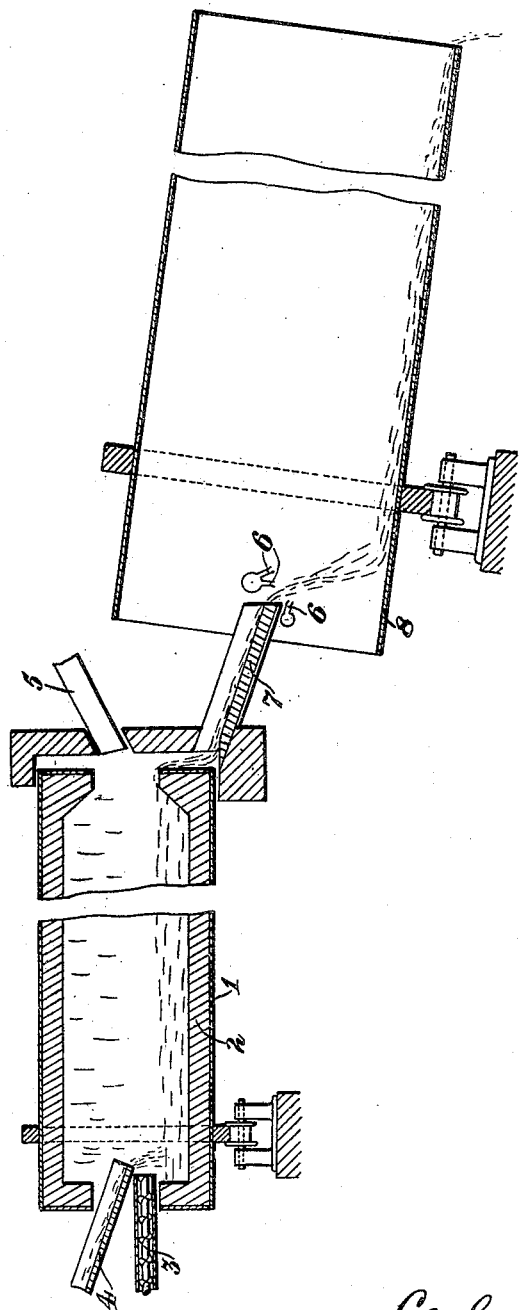
WITNESSES:
INVENTOR
Carl von Forell
BY
Duncan & Duncan ATTORNEYS

UNITED STATES PATENT OFFICE.

CARL VON FORELL, OF HAMBURG, GERMANY, ASSIGNOR, BY MESNE ASSIGNMENTS, TO THE ATLAS PORTLAND CEMENT COMPANY, OF NEW YORK, N. Y., A CORPORATION OF PENNSYLVANIA.

PROCESS OF MANUFACTURING CEMENT.

982,945.  Specification of Letters Patent.  Patented Jan. 31, 1911.

Application filed December 19, 1901. Serial No. 86,597.

*To all whom it may concern:*

Be it known that I, CARL VON FORELL, a subject of the German Emperor, residing at Hamburg, Germany, have invented certain new and useful Improvements in Processes of Manufacturing Cement, of which the following is a specification, taken in connection with the accompanying drawing, forming part of the same.

This invention relates to the process of manufacturing cement from furnace slag in which the slag receives an admixture of lime which is incorporated therewith, the mixture being subsequently disintegrated so as to form a highly cementitious granulated material which can be used as cement when properly ground.

The accompanying drawing is a somewhat diagrammatic vertical section showing apparatus which may be used in carrying out this process.

Ground lime is added to the liquid furnace slag in the proper quantities and thereafter the two materials are preferably intimately mingled and kept at a suitable temperature to cause the thorough incorporation of the various ingredients. This may be done in a suitable chamber or rotary kiln, the material being maintained in a fluid condition throughout the mixing process. The mixed material is then disintegrated in a uniform manner so as to form granulated material or cement clinker having highly cementitious properties.

In carrying out this process, a mixing furnace in the form of a horizontal or slightly inclined rotating cylinder or drum, 1, may be used, preferably having a suitable lining, 2, of fire resisting material, and which may be arranged to be heated by internal or external heating means. The molten furnace slag is run into this mixing furnace, as by the spout, 4, filling it up to the desired height, one-third of its height for instance. The proper amount of ground lime for forming the cement is also introduced into the furnace by a screw conveyer, 3, or other distributing means, the furnace being rotated, of course, in the usual way. In order to maintain the proper temperature of the mixture during the rotation of the mixing furnace a supply of heated air from a burner or blast nozzle, as 5, may be provided which may be either forced into or conducted over the mixture in the furnace. In this way, an eddying motion may be set up in the mixture which will secure its homogeneity and also assist in desulfurizing it. Instead of air, oxygen or other gas or a mixture of gases may of course be employed for this purpose.

The ingredients are thoroughly incorporated and combined in this way and their homogeneous condition secured by the rotation of the furnace, since by this means the material is carried up about half way on the ascending side of the furnace and then is thrown or falls back again; so that after treating the material in this way for the desired length of time during which it is kept in a molten condition to secure the better union of the various ingredients, the homogeneous liquid mixture may be discharged from the revolving furnace for further treatment.

For the purpose of disintegrating the material after having thus treated and made it homogeneous, the fluid mass may either immediately on leaving the furnace or at any subsequent period be granulated, as is well known in this art and a steam injector or other disintegrating means may be used for this purpose. An arrangement adapted to this end and forming a convenient supplement or attachment to the rest of the apparatus may comprise a jet tube or set of jet tubes, 6, arranged at the outlet chute, 7, which joins the mixing furnace at the lower end and conveys the mixture in fusion into a rotating cylinder, 8, or the like, so as to enable one or a number of steam jets to be sent into the mixture running out of the furnace, such jet or jets having practically the same direction as the current of liquid mixture which by such means will become uniformly disintegrated or granulated. The granulated material thus obtained is a cement clinker having highly cementitious properties and forming cement when properly ground.

It is, of course, understood by those familiar with this art that many modifications may be made in the number and order of the steps of this process and that variations may be made in the form, proportions and numbers of parts of the apparatus described for carrying out this process. I do not therefore desire to be limited to the details of the disclosure which has been made in this case, but

What I claim as new and what I desire to secure by Letters Patent is set forth in the appended claims.

1. The cement process which consists in adding lime to molten furnace slag in a rotary kiln, in passing heated fluid containing oxygen through said kiln, in mechanically agitating the mixture by the movement of said kiln to separate said material and project portions thereof through said fluid to desulfurize said mixture, and in disintegrating said mixture by fluid jets containing oxygen to produce highly cementitious clinker material.

2. The cement process which consists in feeding a mixture of highly heated slag material and lime through a rotary kiln and in passing heated oxygen bearing fluids through said kiln, in mechanically agitating said mixture by the rotation of said kiln to separate said mixture and project portions thereof through said fluids to desulfurize said mixture, and in disintegrating said mixture by fluid jets containing oxygen to produce highly cementitious clinker material.

3. The cement process which consists in feeding a mixture of highly heated slag material and lime through a rotary kiln, in passing oxygen-bearing fluid through said kiln, in mechanically agitating said mixture by the rotation of said kiln to separate said mixture and project portions thereof through said fluid to promote the desulfurization of the same, and in disintegrating said mixture to form highly cementitious material.

4. The cement process which consists in feeding highly heated slag material through a rotary kiln, in passing oxygen-bearing fluid through said kiln, in mechanically agitating said slag material by the rotation of said kiln to separate said material and project portions thereof through said fluid to promote the desulfurization of the same, and in disintegrating said slag material to form highly cementitious material.

5. The cement process which consists in feeding highly heated slag material through a rotary kiln, in passing oxygen-bearing fluid through said kiln and in mechanically agitating said slag material by the rotation of said kiln to separate said slag material and project portions thereof through said fluid to promote the desulfurization of said slag material.

6. The cement process which consists in feeding highly heated slag material through a rotary kiln, in passing oxygen-bearing fluid through said kiln, in mechanically agitating said slag material by the rotation of said kiln to cause portions of said slag material to be raised and thrown back again through said fluid to promote the desulfurization of said slag material.

7. The cement process which consists in feeding a highly heated mixture of lime and slag material into a chamber, in passing oxygen-bearing fluid through said chamber, in mechanically agitating said mixture to bring separated portions thereof into contact with said fluid to promote the desulfurization of said mixture and in disintegrating said mixture to produce highly cementitious material.

8. The cement process which consists in feeding substantially molten furnace slag into a movable chamber, in passing fluid containing oxygen through said chamber and in mechanically agitating said material by the substantially constant movement of said chamber to separate said material and project different portions thereof into contact with said fluid to promote desulfurization of said material.

9. The cement process which consists in feeding substantially molten furnace slag into a rotary kiln, in passing oxygen bearing fluid through said kiln, in mechanically agitating said slag by the rotation of said kiln to cause portions of said slag material to be raised and thrown back again through said fluid to promote the desulfurization of said slag and in disintegrating said slag out of substantial contact with water to produce highly cementitious material.

10. The cement process which consists in feeding a mixture of lime and molten slag through a rotary kiln, in passing fluid containing oxygen through said kiln, in mechanically agitating the mixture by means of said kiln to separate said material and project portions thereof through said fluid to promote the desulfurization of said mixture and in disintegrating said mixture out of substantial contact with water to form highly cementitious clinker material.

11. The cement process which consists in incorporating lime with highly heated furnace slag material and in granulating the same out of substantial contact with water to form highly cementitious clinker material.

12. The cement process which consists in incorporating alkaline material with substantially molten slag material and disintegrating the same out of substantial contact with water into highly cementitious clinker material.

13. The cement process which consists in incorporating alkaline material with highly heated slag material, in treating the mixture with fluid containing oxygen to promote the desulfurization of the mixture and in disintegrating said mixture out of substantial contact with water to form highly cementitious clinker material capable of producing cement when ground without further additions.

14. The cement process which consists in feeding a mixture of lime and substantially molten furnace slag through a rotary kiln, in passing heated fluid containing oxygen through said kiln, in mechanically agitating the mixture by movement of said kiln to separate said material and project portions thereof through said fluid to desulfurize said mixture, in feeding said substantially molten mixture into a rotary disintegrating cylinder and in acting upon said mixture by fluid jets containing oxygen to effect the disintegration of said mixture into clinker material.

15. The cement process which consists in feeding substantially molten material comprising furnace slag into a rotating disintegrating cylinder and in acting on said material by jets of fluid containing oxygen to produce disintegrated clinker material.

16. The cement process which consists in feeding substantially molten slag material into a rotary disintegrating cylinder, in treating said material with fluid jets and in rotating said cylinder to effect the substantially uniform disintegration of said material into clinker.

17. The cement process which consists in feeding substantially molten slag material into a disintegrating chamber, in subjecting the same to the action of fluid jets and in rotating said chamber and effecting the disintegration of said material.

In witness whereof I have hereunto set my hand in presence of two witnesses.

CARL VON FORELL.

Witnesses:
 OTTO W. HELLMRICH,
 J. CHRIST. HAFFEMANN.